United States Patent [19]

Takahashi et al.

[11] 4,126,985

[45] * Nov. 28, 1978

[54] LAWN MOWER

[75] Inventors: Katsuhiko Takahashi, Tokorozawa; Hachiro Doi, Kamifukuoka, both of Japan

[73] Assignee: Fuso Keigokin Co., Ltd., Tokyo, Japan

[ * ] Notice: The portion of the term of this patent subsequent to Jun. 7, 1994, has been disclaimed.

[21] Appl. No.: 771,567

[22] Filed: Feb. 24, 1977

Related U.S. Application Data

[63] Continuation-in-part of Ser. No. 610,222, Sep. 4, 1975, Pat. No. 4,027,463.

[30] Foreign Application Priority Data

Jul. 31, 1976 [JP] Japan ................................. 51-91802

[51] Int. Cl.² .......................................... A01D 55/26
[52] U.S. Cl. ..................................... 56/13.6; 56/17.5; 56/295
[58] Field of Search ..................... 56/13.6, 16.7, 17.5, 56/255, 295, 53, 96

[56] References Cited

U.S. PATENT DOCUMENTS

| 1,207,580 | 12/1916 | Luce ........................................ 56/96 |
| 1,349,266 | 8/1920 | Cogburn ................................. 56/53 |
| 4,027,463 | 6/1977 | Fakahashi et al. ..................... 56/13.6 |

Primary Examiner—Russell R. Kinsey
Attorney, Agent, or Firm—Oblon, Fisher, Spivak, McClelland & Maier

[57] ABSTRACT

Disclosed is a lawn mower having several pairs of rotatable blades attached to a rotatable frame. The rotatable frame is motor driven, and centrifugal forces cause a frictional engagement between blade driving means and a portion of the frame so that each pair of the blades assume a planetary rotary motion, yet are capable of movement away from obstacles. Each pair of blades consists of two overlapping circular blades that are in frictional engagement with each other and rotate in opposite directions to effect a cutting action.

4 Claims, 3 Drawing Figures

LAWN MOWER

CROSS REFERENCE TO RELATED APPLICATIONS

This application is a continuation-in-part of co-pending U.S. patent application Ser. No. 610,222, filed Sept. 4, 1975, now U.S. Pat. No. 4,027,463.

BACKGROUND OF THE INVENTION

1. Field of the Invention

This invention relates generally to lawn mowers, and more particularly to a lawn mower having several pairs of rotatable blades driven by friction means to assume a planetary rotary motion.

2. Description of the Prior Art

Conventional lawn mowers may be classified according to mechanism, such as the reel type, the rotary type, the hair-clipper type, and the like. They are generally characterized by a positive, direct drive and thus obstacles such as stones and the like will damage the blades when struck. Further, many lawn mowers such as the reel type require maintenance of relatively fine tolerances by constant adjustment to ensure good cutting action.

SUMMARY OF THE INVENTION

Accordingly, one object of this invention is to provide a motor driven lawn mower with a simple mechanism.

Another object of this invention is to provide a motor driven lawn mower having a centrifugally engaged frictional drive means to rotate the grass cutting blades.

A still further object of this invention is to provide a motor driven lawn mower with several pairs of cutting blades that assume a planetary rotary motion.

Yet another object of this invention is to provide a motor driven lawn mower with blades capable of movement away from obstacles.

And yet another object of this invention is to provide a motor driven lawn mower with each pair of blades consisting of two circular blades that are in frictional engagement with each other and rotate in opposite directions to effect a cutting action.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein.

DESCRIPTION OF A PREFERRED EMBODIMENT

Figure 1:
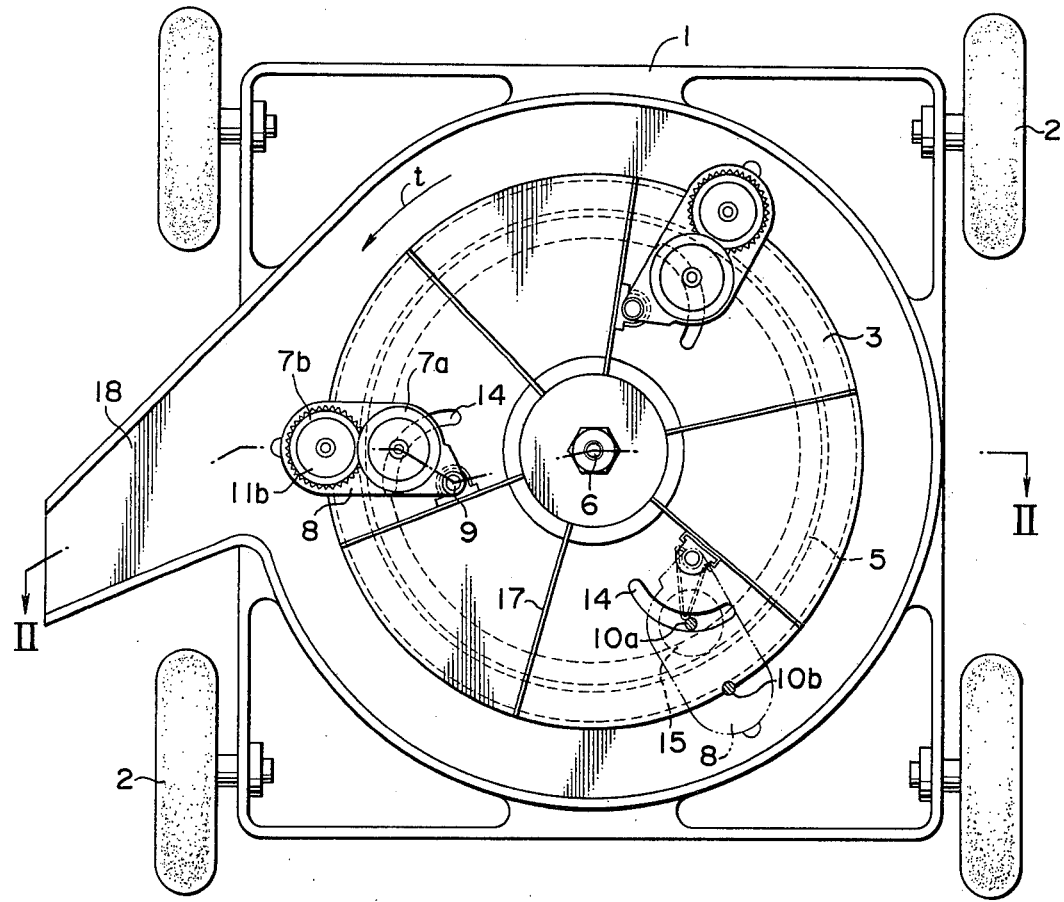
FIG. 1 is a bottom view of the lawn mower illustrating a plurality of blade pairs and having portions of the drive means shown in dotted lines.
Figure 2:
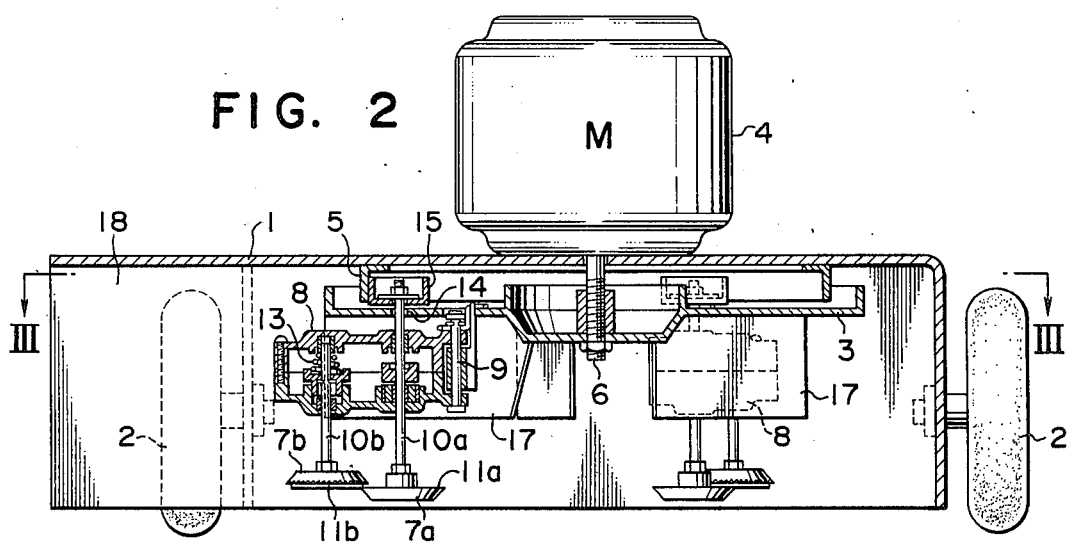
FIG. 2 is a cross-sectional view taken along the line II—II in FIG. 1.
Figure 3:
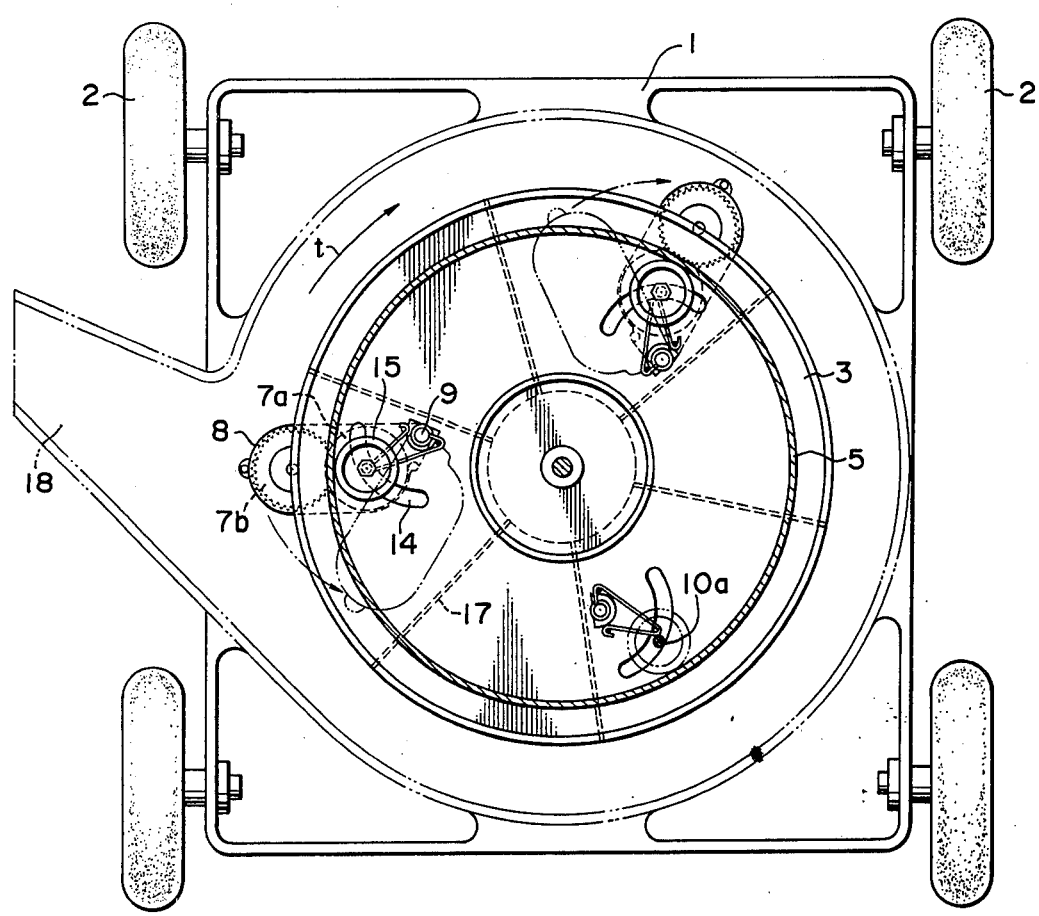
FIG. 3 is a cross-sectional view taken along the line III—III in FIG. 2.

The lawn mower has a frame 1 of conventional design that when viewed in cross section has an inverted U-shape. Wheels 2 are attached to the frame at its four corners so that the mower may be rolled across the lawn. A motor M is mounted on the top of frame 1 and may be a conventional gasoline or electrical motor enclosed within protective housing 4. Extending down through bearings (not shown) in frame 1 is motor shaft 6 and attached thereto is rotary disc 3. A stationary frictional ring 5 is attached to the inner face of the top portion of frame 1 and is formed from steel or some other material with high wear resistance.

A plurality of blade mounts 8 are mounted on and carried by rotary disc 3 and, for example, the number of such blade mounts may be three, spaced 120° apart. Each blade mount 8 is pivotally mounted to rotary disc 3 by means of pivot pin 9. Each blade mount 8 is a generally oblong-shaped enclosure, carrying two blade mounting shafts 10a and 10b, and appropriate bearing means for both shafts. Shaft 10a is of a length to extend beyond the top and bottom of blade mount 8 and carries on its upper end a frictional roller 15 and on its lower end a lower cutting blade 7a. The said bearing means in blade mount 8 support both shafts for rotation. Shaft 10b is of a length sufficient only to extend below blade mount 8 and carries on its extremity an upper cutting blade 7b.

An arcuate slot 14 is formed in rotary disc 3 at each location of a blade mount 8, and the radius of the arc is equivalent to the distance between pivot pin 9 and shaft 10a so that blade mount 8 may move in an arcuate path defined by arcuate slot 14 under the influence of centrifugal force when motor M drives rotary disc 3.

Friction ring 5 is of a size and location so that each of the frictional rollers 15 come into contact with the interior surface of friction ring 5 when they are outwardly biased by centrifugal force, thereby rotating as they move in contact with frictional ring 5. Because frictional roller 15 is fixedly mounted to shaft 10a, that shaft also rotates, in turn rotating blade 7a. Spring 13, within blade mount 8, bears against the interior of mount 8 and a stop on shaft 10b to bias shaft 10b and its attached blade 7b toward blade 7a. It is found that the frictional engagement thus created between blades 7a and 7b is sufficient to insure the rotation of blade 7b when blade 7a is rotated by frictional roller 15. By virtue of the mating cutting surfaces 11a and 11b on blades 7a and 7b, the grass coming into contact with the blades will be severed. It is noted that upper cutting blade 7b has serrated teeth formed thereon to further facilitate cutting grass.

Fins 17 are rigidly attached to the under surface of rotary disc 3 and generate an air flow to assist in directing severed grass out of the chute or nozzle 18 of the frame visible to the left side of FIG. 1.

A particular advantage with the structure of the present invention is the ability of the blade mounts to move away from obstacles such as stones when they come into contact therewith. Rotation of rotary disc 3 is in the direction shown by arrow t in FIG. 1 and thus the leading edge of blade mount 8 in the region of blade 7b would be the portion of the blade mount means that would strike the obstacle. The force of contact would bias the entire enclosure in a clockwise fashion around pivot point 9, thereby allowing the blade assembly to move away from the obstacle.

It is considered desirable to have frictional roller 15 formed of hard rubber or synthetic resin coated metal to increase frictional engagement between roller 15 and frictional ring 5. Further, frictional roller 15 should approximate the diameter or be somewhat smaller than that of the rotary blades 7a and 7b to facilitate a high speed rotation of the blades. For noise reduction, a hollow, tire type rotary roller may be employed.

In a lawn mower of the type pictured in FIG. 1, the lawn mower insures an efficient cutting of grass and since centrifugal force is utilized for the rotary movement of the blades, the mechanism is highly simplified and thus maintenance and inspection are also simplified. Due to the balanced placements of the blade mount assemblies, the rotational movement of both rotary disc 3 and the individual blades relative to each other is highly stable.

Recognition that frictional engagement between the blades is sufficient to drive one blade by means of another enables bulky gear train mechanisms between blades to be eliminated. Thus, blade mounts 8 may be designed to be smaller and lighter. This in turn is advantageous for several reasons. Rocking inertia, i.e. the centrifugal force applied to mount 8 at the time of starting the mower, is reduced. Further, the shock and noise generated at the moment when the rotary roller contacts the stationary ring is reduced. Also, since blade mounts 8 are lighter, the force between the rotary roller and stationary disc is less during operation, thereby insuring a longer operating life for the rollers.

Obviously, numerous modifications and variations of the present invention are possible in light of the above teaching. It is therefore to be understood that within the scope of the appended claims the invention may be practiced otherwise than as specifically described herein.

What is claimed as new and desired to be secured by Letters Patent of the United States is:

1. A lawn mower comprising:
   a frame with means to support said frame on the ground,
   a motor driven rotary disc supported by and disposed within said frame,
   a pair of coacting blades carried by said rotary disc,
   frictional means for driving said blades under the influence of centrifugal force, comprising a stationary ring carried by said frame, and a frictional roller mounted upon said disc and being capable of pivotal movement relative to said disc so that when said disc rotates, said frictional roller pivots into contact with said ring under the influence of centrifugal force,
   means connecting said frictional roller to one of the blades of said pair of coacting blades so that said one blade rotates with said frictional roller, and
   biasing means for pressing both blades of said pair of coacting blades together so that frictional engagement between said blades will permit the blade connected to said roller to drive the other.

2. The lawn mower of claim 1, including
   blade mount means supporting said pair of coacting blades and being pivotally mounted on said rotary disc, with
   said means connecting said frictional roller to one blade being a shaft that passes through both sides of said blade mount means.

3. The lawn mower of claim 2, wherein
   a second shaft is carried by said blade mount means, and
   said biasing means is a spring surrounding said second shaft and which bears against the interior of said blade mount means and a stop on said second shaft.

4. The lawn mower of claim 1, wherein
   there are a plurality of said pair of coacting blades symmetrically spaced about the perimeter of said rotary disc.

* * * * *